US012554623B2

(12) United States Patent
Ooka et al.

(10) Patent No.: US 12,554,623 B2
(45) Date of Patent: Feb. 17, 2026

(54) AUTOMATIC METAMORPHIC TESTING

(71) Applicant: International Business Machines Corporation, Armonk, NY (US)

(72) Inventors: Alisa Ooka, Fujimino (JP); Futoshi Iwama, Tokyo (JP); Issei Yoshida, Setagaya-ku (JP); Sachiko Yoshihama, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 224 days.

(21) Appl. No.: 17/695,134

(22) Filed: Mar. 15, 2022

(65) Prior Publication Data

US 2023/0297494 A1   Sep. 21, 2023

(51) Int. Cl.
G06F 11/3668   (2025.01)

(52) U.S. Cl.
CPC ...... *G06F 11/3684* (2013.01); *G06F 11/3688* (2013.01)

(58) Field of Classification Search
CPC ............... G06F 11/36–3696; G06F 11/3698
See application file for complete search history.

(56) References Cited

U.S. PATENT DOCUMENTS 10,438,118 B2 * 10/2019 Dwarakanath ...... G06F 11/3684
2019/0108443 A1 * 4/2019 Dwarakanath ...... G06F 11/3684

FOREIGN PATENT DOCUMENTS

CN   113485932 A   10/2021

OTHER PUBLICATIONS

Arno, A., et al., Automated Metamorphic Testing using Transitive Relations for Specializing Stance Dection Models, 2023 IEEE/ACM 45th Int'l Conf. on S/W Eng.: S/W Eng. in Practice [online], 2023 [retrieved Mar. 8, 2024], Retrieved from Internet: <URL: https://ieeexplore.ieee.org/document/1017>, pp. 467-470.*
Li T., et al., A Logic-Driven Framework for Consistency of Neural Models, Proceedings of the 2019 Conf. on Emprical Methods in NLP and the 9th Int'l Joint Conf. on NLP [online], 2019 [retrieved Mar. 9, 2024], Retrieved from Internet: <URL: https://aclanthology.org/D19-1405.pdf>, pp. 3924-3935.*
Yanaka, H., et al., Exploring Transitivity in Neural NLI Models through Veridicality, Proceedings of the 16th Conf. of the European Chap. of the Assoc. for Computational Linguistics [online], 2021 [retrieved Mar. 9, 2024], Retrieved from Internet: <URL: https://aclanthology.org/2021.eacl-main.78.pdf>, pp. 920-934.*
Sammons, M., Recognizing Textual Impairment [online], 2015 [retrieved Mar. 10, 2024], Retrieved from Internet: <URL: https://public.websites.umich.edu/~vgvinodv/papers/TeChapter.pdf>, pp. 1-64.*

(Continued)

*Primary Examiner* — Todd Aguilera
(74) *Attorney, Agent, or Firm* — Harrity & Harrity, LLP (57) ABSTRACT

Computer hardware and/or software that performs the following operations: (i) identifying a test input for a system under test, the system under test configured to determine a strength of a relationship between received inputs; (ii) determining, from a data store of potential inputs, a set of inputs for which the strength of the relationship to the identified test input according to the system under test meets a first threshold; and (iii) utilizing the determined set of inputs to test a transitive consistency of an output of the system under test.

20 Claims, 7 Drawing Sheets

(56) References Cited

OTHER PUBLICATIONS

Asyrofi et al., "BiasFinder: Metamorphic Test Generation to Uncover Bias for Sentiment Analysis Systems", Journal of Latex Class Files, vol. 14, No. 8, Aug. 2015, arXiv:2102.01859v1 [cs.SE] Feb. 3, 2021, 12 pages.

Boussaa et al., "Leveraging metamorphic testing to automatically detect inconsistencies in code generator families", Software Testing, Verification and Reliability, Softw. Test. Verif. Reliab. 2019, e1721, Published online In Wiley Online Library (wileyonlinelibrary.com), Accepted Oct. 8, 2019, 26 pages, <https://doi.org/10.1002/stvr.1721>.

Kanstren, Teemu, "Metamorphic Testing of Machine-Learning Based Systems", Techniques for Testing Autonomous Cars and other ML-Based Systems, Towards Data Science, Oct. 23, 2020, 22 pages.

Ribeiro et al., "Beyond Accuracy: Behavioral Testing of NLP Models with CheckList", Proceedings of the 58th Annual Meeting of the Association for Computational Linguistics, Jul. 5-10, 2020, pp. 4902-4912.

Sun et al., "Metamorphic Testing for Machine Translations: MT4MT", 2018 25th Australasian Software Engineering Conference (ASWEC), DOI 10.1109/ASWEC.2018.00021, pp. 96-100.

Weyuker, Elaine J., "On Testing Non-testable Programs", The Computer Journal, vol. 25. No. 4, 1982, pp. 465-470.

Yan et al., "Metamorphic Relations for Data for Data Validation: A Case Study of Translated Text Messages", 2019 IEEE/ACM 4th International Workshop on Metamorphic Testing (MET), pp. 70-75, DOI 10.1109/MET.2019.00018.

\* cited by examiner

| sentence | position | (1) score(si,s*) | | | (2) score(si,t) | | | Difference between (1) and (2) | | | Total absolute value of difference |
|---|---|---|---|---|---|---|---|---|---|---|---|
| | | con_ss | pro_ss | neutral_ss | con_st | pro_st | neutral_st | con_diff | pro_diff | neutral_diff | diff_sum |
| 0 | attacker | 0.998796 | 0.000834 | 0.000370 | 0.999395 | 0.000417 | 0.000188 | 0.000600 | 0.000417 | 0.000182 | 0.001199 |
| 1 | attacker | 0.998141 | 0.000780 | 0.001079 | 0.999054 | 0.000313 | 0.000634 | 0.000913 | 0.000468 | 0.000445 | 0.001825 |
| 2 | attacker | 0.998274 | 0.000939 | 0.000787 | 0.999369 | 0.000377 | 0.000262 | 0.001086 | 0.000562 | 0.000524 | 0.002172 |

| sentence | position | con_ss | pro_ss | neutral_ss | con_st | pro_st | neutral_st | con_diff | pro_diff | neutral_diff | diff_sum |
|---|---|---|---|---|---|---|---|---|---|---|---|
| 36 | target | 0.049533 | 0.520106 | 0.430361 | 0.010402 | 0.943356 | 0.046242 | 0.039131 | -0.423250 | 0.384119 | 0.846499 |
| 64 | defender | 0.040869 | 0.579585 | 0.379546 | 0.322030 | 0.252963 | 0.425008 | 0.261161 | 0.326622 | -0.045462 | 0.653245 |
| 69 | defender | 0.049043 | 0.514227 | 0.436730 | 0.013828 | 0.832117 | 0.366952 | 0.035216 | -0.317890 | 0.282674 | 0.635780 |
| 70 | defender | 0.050344 | 0.506523 | 0.443134 | 0.400123 | 0.232925 | 0.059070 | 0.349780 | 0.273598 | 0.076182 | 0.699559 |
| 71 | defender | 0.220166 | 0.534963 | 0.244870 | 0.015513 | 0.925417 | 0.204653 | 0.204653 | -0.390454 | 0.185800 | 0.780907 |

| pro_ss | label | pro_st | label |
|---|---|---|---|
| 0.520106 | neutral | 0.943356 | pro |
| 0.579585 | neutral | 0.252963 | con |
| 0.514227 | neutral | 0.832117 | pro |
| 0.506523 | neutral | 0.232925 | con |
| 0.534963 | neutral | 0.925417 | pro |

Standard label checking
- If pro(s, s) ≥ 0.6, pro
- If pro(s, s) < 0.4, con
- If 0.4 ≤ pro(s, s) < 0.6, neutral

AUTOMATIC METAMORPHIC TESTING

BACKGROUND

The present invention relates generally to the field of metamorphic testing, and more particularly to the automatic metamorphic testing of a computer system.

Metamorphic testing is a property-based software testing technique useful in situations where calculating an expected output for an input is not practical. With metamorphic testing, instead of generating an expected output for an input, for example, inputs and outputs having expected relationships are generated, such that a relationship between two inputs is indicative of the relationship between the two outputs generated from those inputs.

SUMMARY

According to an aspect of the present invention, there is a method, computer program product and/or system that performs the following operations (not necessarily in the following order): (i) identifying a test input for a system under test, the system under test configured to determine a strength of a relationship between received inputs; (ii) determining, from a data store of potential inputs, a set of inputs for which the strength of the relationship to the identified test input according to the system under test meets a first threshold; and (iii) utilizing the determined set of inputs to test a transitive consistency of an output of the system under test.

DETAILED DESCRIPTION

While metamorphic testing can provide a variety of benefits, current attempts have fallen short at a fully automatic metamorphic testing solution. Various embodiments of the present invention introduce both a partially automated and a fully automated approach to metamorphic testing that utilize a system under test itself to produce metamorphic testing-ready datasets, thereby improving upon existing solutions and allowing for automation of each aspect of the metamorphic testing process. This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
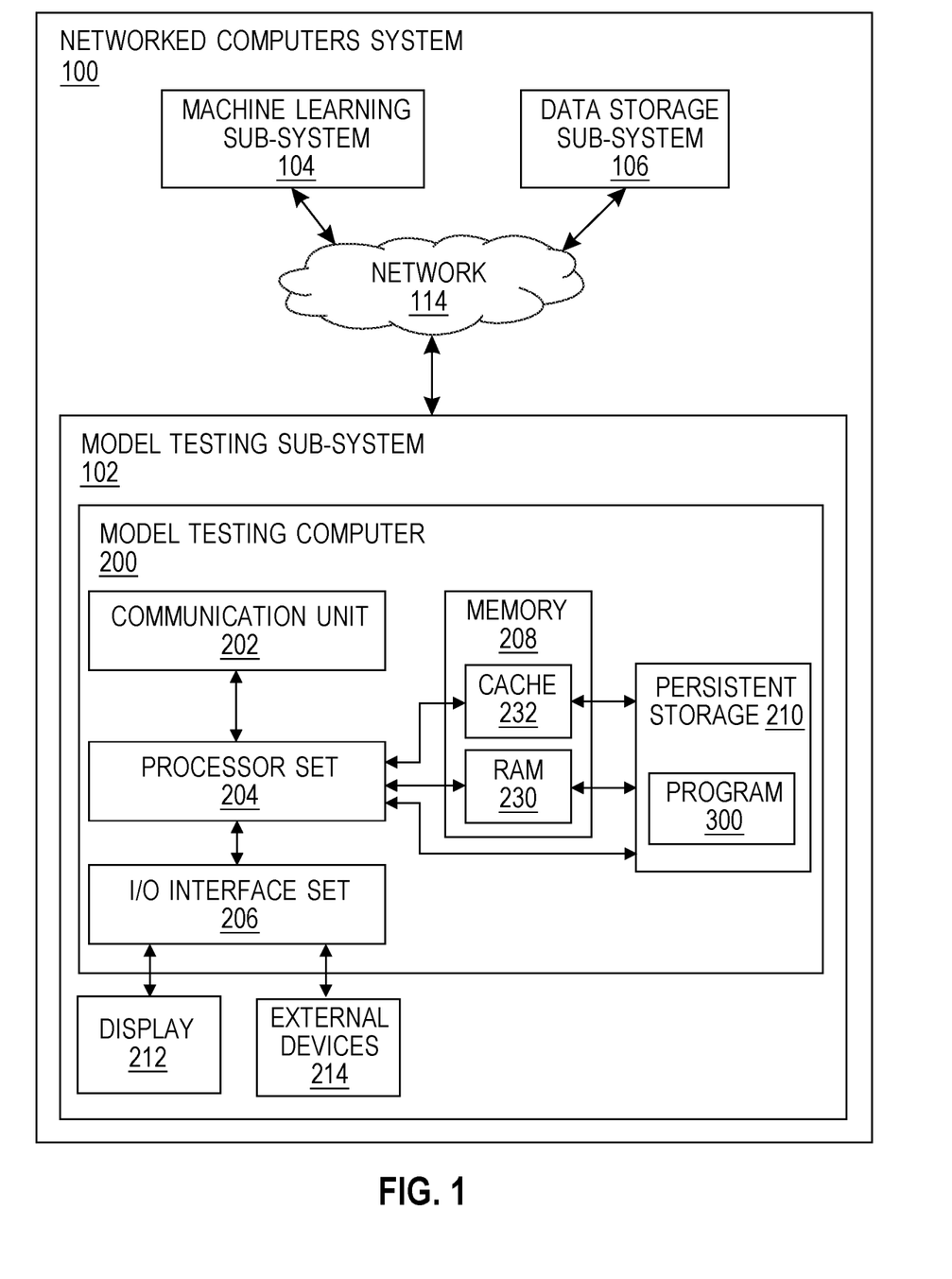
FIG. 1 is a block diagram view of a first embodiment of a system according to the present invention.

An embodiment of a possible hardware and software environment for software and/or methods according to the present invention will now be described in detail with reference to the Figures. FIG. 1 is a functional block diagram illustrating various portions of networked computers system 100, including: model testing sub-system 102; machine learning sub-system 104; data storage sub-system 106; communication network 114; model testing computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
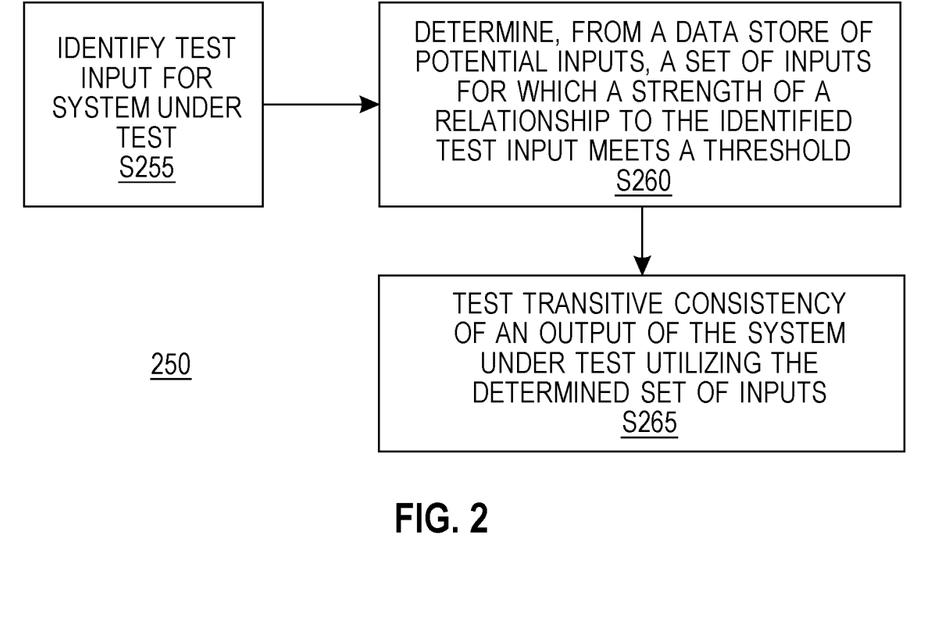
FIG. 2 is a flowchart showing a first embodiment method performed, at least in part, by the first embodiment system.
Figure 3:
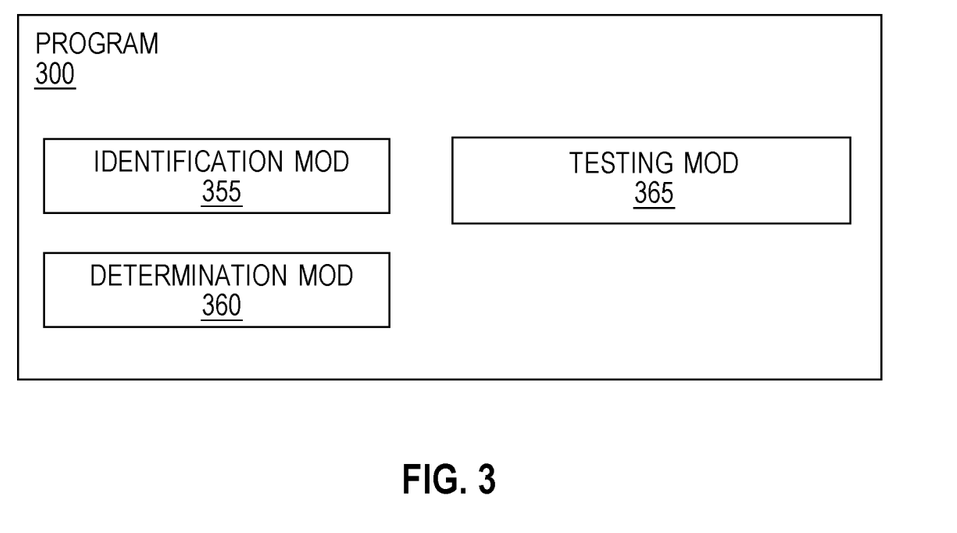
FIG. 3 is a block diagram showing a machine logic (for example, software) portion of the first embodiment system.

FIG. 2 shows flowchart 250 depicting a method according to the present invention. FIG. 3 shows program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Generally speaking, in this example embodiment (also referred to in this sub-section as the "present embodiment," the "present example," the "present example embodiment," and the like), program 300 of model testing sub-system 102 is configured to automatically (or without substantial human intervention) generate training data for a system under test utilizing a data store of potential inputs. In this particular embodiment, the system under test is a machine learning model of machine learning sub-system 104 and the data store is an input data store of data storage sub-system 106. Program 300 employs a metamorphic testing approach, where instead of generating specific outputs for specific inputs of training (or testing) data, the system generates sets of training data such that a relationship between inputs corresponds to a relationship between the outputs generated for those inputs. By generating training data having such a correspondence between input and output relationships, the present embodiment (and other embodiments, including those discussed in the Further Comments and/or Embodiments sub-section of this Detailed Description) is able to automatically and more accurately train models (such as the machine learning model of machine learning sub-system 104) that have traditionally been difficult to accurately train.

It should be recognized that while the present example embodiment depicts the system under test as being a machine learning model of machine learning sub-system 104, in other embodiments that might not be the case. For example, the Further Comments and/or Embodiments sub-section, below, describes embodiments that utilize pro/con score evaluators such as stance evaluators and reachability evaluators. While these examples are all illustrative of various features of embodiments of the present invention, they are not meant to be limiting, and in various other embodiments other known (or yet to be known) systems for which transitive relations exist between outputs may also be used.

The machine learning model of machine learning sub-system 104, broadly speaking, is configured to determine a strength of a relationship between inputs. In other words, the machine learning model receives at least two inputs, and based on those inputs, generates an output indicative of the relationship (or lack thereof) between the inputs. The relationship may by any of a wide variety of possible relationships between entities as are known (or yet to be known) in the art. For example, the relationship may be a logical implication relationship, indicating a degree to which a first input (e.g., "my umbrella is wet") logically implies a second input (e.g., "it rained today"), or an agree/disagree relationship, indicating a degree to which a first input and a second input agree or disagree with each other. Some other examples of relationships contemplated by various embodiments of the present invention include, for example: (i) semantic similarity (i.e., similarity of meaning) relationships; (ii) syntactical similarity (i.e., similarity of syntax)

relationships; (iii) temporal similarity (i.e., being associated with a similar time) relationships; (iv) reachability relationships; (v) causality relationships; and/or (vi) the like. Further, while the inputs mentioned above are natural language sentences of natural language text, it should be recognized that a wide variety of possible input formats/types may also be used, including, for example: (i) numerical and/or alphanumerical inputs; (ii) pictural and/or video inputs (whether in two dimensions, three dimensions, or otherwise); (iii) multi-modal inputs (comprising multiple types of inputs); and/or (iv) the like.

Processing begins at operation S255, where identification mod 355 identifies a test input for the system under test (i.e., the machine learning model of machine learning sub-system 104). The test input, as used herein, is simply an example input that will be utilized in generating training data for the machine learning model. In many cases, the test input includes two values, where the first value has been determined as having a sufficiently strong relationship to the second value (and where the first value and the second value are sometimes referred to as the "test input" and the "additional test input," or as "seed sentence s*" and "target sentence t," respectively). Notably, in this embodiment (and in many other embodiments), the strength of the relationship between input values is determined by the system under test (i.e., the machine learning model) itself—the inputs are provided to the system under test, and if the resulting output meets a particular threshold (e.g., threshold Th, discussed below), the inputs are used as the test input of operation S255.

In some cases, the test input and the additional test input (i.e., s* and t) are received from a user, while in other cases the test input and the additional test input are generated by model testing sub-system 102 utilizing the machine learning model and the data store of data storage sub-system 106. These two approaches are described in further detail below, in the Further Comments and/or Embodiments Sub-Section of this Detailed Description, as "Approach 1" and "Approach 2," respectively.

Processing proceeds to operation S260, where determination mod 360 determines, from a data store of potential inputs (i.e., the data store of data storage sub-system 106), a set of inputs for which the strength of the relationship to the identified test input according to the system under test (i.e., the machine learning model) meets a threshold. In this operation, mod 360 analyzes the data store and selects inputs that, when combined with the test input described above, result in relationship strengths that exceed the threshold (also referred to as threshold T, which may be the same as or different from the threshold mentioned above with respect to the creation of the test input).

The data store may comprise any of a wide variety of input data as described above. In the present example embodiment, and in various embodiments discussed below, the data store includes news articles from a news article repository, but a wide variety of other known (or yet to be known) data stores may also be employed.

It should be noted that in many cases, when using multiple inputs (the "test input" and the "additional test input"), the relationship referred to in operation S260 is the relationship between the potential model inputs (also referred to as si) in the data store and the test input (i.e., s*), not the additional test input (i.e., t). In other words, an input of the set of inputs determined in operation S260 has a sufficiently strong relationship to the test input, which itself has a sufficiently strong relationship to the additional test input. This distinction is important for the metamorphic testing approach employed by the present embodiment, and is necessary for testing the transitive consistency of the system under test, as will be discussed below.

In various embodiments, determining the set of inputs further includes removing from the set of inputs one or more inputs based on a comparison of those inputs to the additional test input discussed above. For example, in one case (referred to below as "Check Method 1"), the removed one or more inputs have a strength of relationship to the additional input that fails to meet a threshold (also referred to as threshold Tr, which may be equal to or different from the thresholds mentioned elsewhere in other contexts). In another case (referred to below as "Check Method 2"), the removed one or more inputs are determined by calculating an absolute value of the difference between a strength of a relationship with the test input and a strength of a relationship with the additional test input, and determining that the absolute value is above a threshold (also referred to as threshold Tb, which may or may not be equal to the thresholds mentioned elsewhere).

Processing proceeds to operation S265, where testing mod 365 tests the transitive consistency of an output of the system under test (i.e., the machine learning model) utilizing the determined set of inputs. As mentioned above, the goal of generating the training data (the "set of inputs") in the present embodiment is to generate data with a correspondence between input and output relationships, and as such the testing of the machine learning model in the present embodiment involves comparing various inputs and their corresponding outputs generated by the model. More specifically, in various embodiments, the testing includes providing the additional test input and a first input from the set of inputs to the machine learning model as input, yielding a first output; providing the additional test input and a second input from the set of inputs to the machine learning model as input, yielding a second output; and then performing a comparison between the first output and the second output.

As an example, when the test inputs are modified according to Check Method 1 and/or Check Method 2, described above (and in further detail below), utilizing the set of inputs to test the transitive consistency of the output of the machine learning model includes utilizing the determined set of inputs as test pass data and utilizing the removed one or more inputs as test failure data. A wide variety of other comparisons may also be performed, as are known (or yet to be known) in the art.

III. Further Comments and/or Embodiments

Various embodiments of the present invention recognize that for systems where the output is not uniquely determined for the input, or cannot be determined in advance, the traditional test method of calculating the output for the input and testing whether the value is consistent with the expected value may not test well—for example, when testing a system containing machine-learning-based data, or context-sensitive data. In such cases, a kind of method called metamorphic testing has been proposed and implemented.

Figure 4:
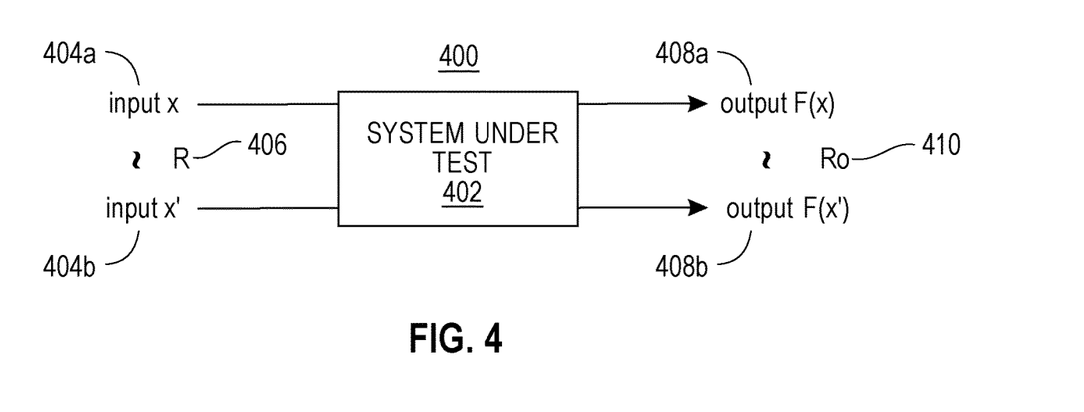
FIG. 4 is a diagram of a simplified computing environment according to an embodiment of the present invention.

FIG. 4 is a diagram of a simplified computing environment according to an embodiment of the present invention. As shown in FIG. 4, environment 400 includes system under test 402, with input x 404a and input x' 404b having relation R 406, and with output F(x) 408a and output F(x') 408b having relation Ro 410. Various embodiments of the present invention recognize that, for metamorphic testing, if one can find a computable relation R, Ro such that for any input x, x' in the relation R, the output F(x), F(x') of the system satisfies the relation Ro, then one can use this to perform the following test without giving the expected value of the system: Check Ro(F(x),F(x')) for input x, x' such that R(x,x').

One example of metamorphic testing is testing for sentiment (positive/negative) evaluation Sentiment(S)) of Sentence S. In this example, one checks (Sentiment(S)=positive⇔Sentiment(not S)=negative) or (Sentiment(S)=negative⇔Sentiment(not S)=positive) for sentence S, where not S represents a sentence that appropriately negates S. Another example of metamorphic testing is testing for sentiment evaluation Sentiment(S) of sentence S using translation modules M. In this example, one checks Sentiment(S)=Sentiment(M(S)) for sentence S, where, for example, Sentiment("I love apples")=Sentiment(M("I love apples")) =Sentiment( "私はりんごが好きです (i.e., translated text))).

Various embodiments of the present invention provide an automatic metamorphic test system for checking pro/con transitivity of a pro/con score evaluator. In these embodiments, for example, the pro/con score evaluator is a stance detection evaluator that receives sentences s1 and s2 as input and returns the degree to which s1 agrees with s2, pro(s1, s2) and the degree to which s1 disagrees with s2, con(s1, s2), where 0<=pro(s1, s2)<=1, 0<=con(s1, s2)<=1, 0<=pro(s1, s2)+con(s1, s2)<=1.

In various embodiments, the metamorphic test system checks that the output of the pro/con score evaluator is consistent with respect to the logical transitivity of the sentence with respect to agree/disagree. For example, for thresholds T1, T2, T3, T4 having values between 0 and 1 (e.g., 0.7), the system checks the following:

[P1] If pro(s2, s1)>T1 and pro(s3, s2)>T2, then pro(s3, s1)>T3;

[P2] If con(s2, s1)>T1 and pro(s3, s2)>T2, then con(s3, s1)>T3;

[P3] If pro(s2, s1)>T1 and con(s3, s2)>T2, then con(s3, s1)>T3; and

[P4] If pro(s2, s1)>T1, pro(s3, s2)>T2, and pro(s4, s3)>T3, then pro(s4, s1)>T4.

Figure 5:
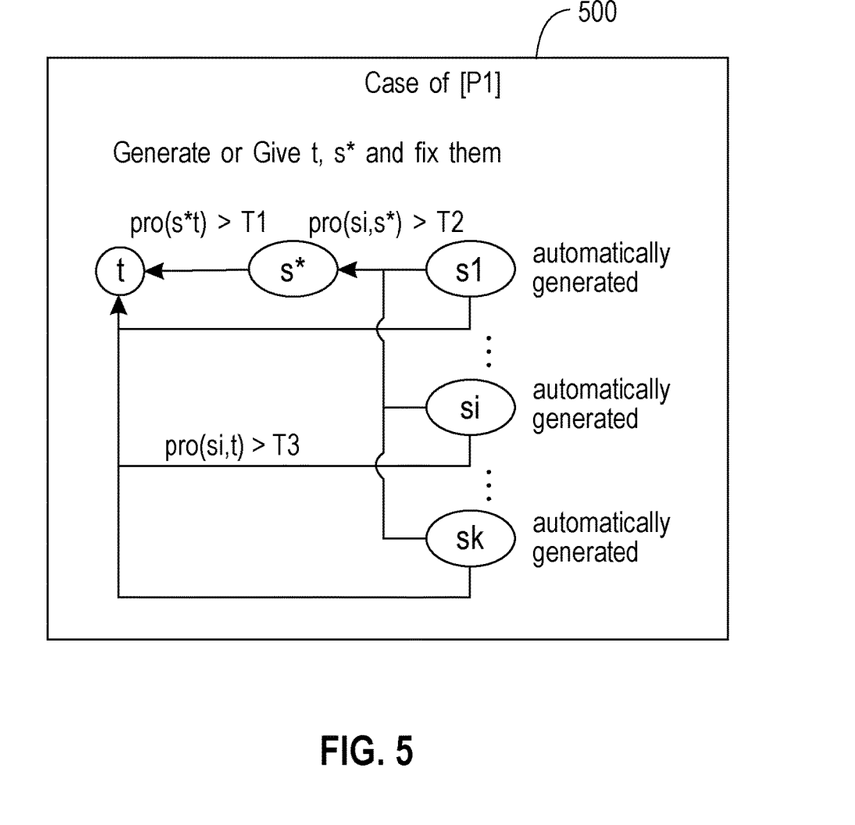
FIG. 5 is a diagram including information helpful in understanding test steps according to an embodiment of the present invention.

FIG. 5 includes diagram 500 which includes information helpful in understanding the test steps for [P1] as described above. In the embodiment shown in FIG. 5, the test steps for [P1] are as follows (where [P2], [P3], and [P4] may be defined in the same or similar way):

Assume that pro(s, s') and con(s, s') are pro/con scores of an SUT (system under test), and that threshold Th, T, Tb are in [0,1] and represent how rigorously transitive consistency is defined;

Step 1: Input sentences t and s* such that s* (logically) implies t [Approach 1]; Generate sentences t and s* such that pro(s*, t)>Th [Approach 2];

Step 2: Generate sentences si (including sentences s1, si, and sk depicted in FIG. 5) from sentence data store, such as a news data store, and collect the sentences for which pro(si,s*)>T; and Step 3: Check pro(si,t)>Tr [Check Method 1] or Check-|pro(si,t)−pro(s*,t)|<Tb [Check Method 2], and collect s,s*,t as test failure data.

In various embodiments, a test system automatically generates test data by using the SUT itself and a news article store to generate s' such that s'=>s (under the judgment of the SUT) from a sentence s, where s'=>s means that s' agrees with s, that s' implies s, or the like. By using the large news store and the SUT, the test system can find many sentences s' such that s'=>s automatically. This automatically generated data can be used as data to check that the output of the system under test satisfies the transitive consistency for the relation (e.g., agree/disagree, implication, etc.). Various embodiments recognize that this may be the first automatic metamorphic testing to check the consistency of the transitive relation of system output.

Various embodiments of the present invention recognize that for pro/con score evaluators or similar evaluators, the solutions described herein make it possible to fully and/or almost automatically test the transitive consistency of system output. For example, full automation can be achieved by adopting Approach 2, described above, but the time to find meaningful test input may be longer, or the number of the meaningful test inputs found may be smaller. And because the solution can be almost fully automated, it is possible to test the above consistency for a large amount of input without giving the expected results of the test, which may significantly reduce the cost of the testing process.

Various embodiments of the present invention recognize that the category of pro/con score evaluators is rather broad—for example, stance evaluators between sentences and reachability evaluators between two points are considered pro/con score evaluators for the purposes of this disclosure.

Various embodiments of the present invention also recognize that there are many possible properties that can be regarded as transitive relations of the output of the evaluator—such as agree/disagree relationships, reachability relationships, causality relationships, and the like. Therefore, the testing method described herein can also be used for evaluators that evaluate these relationships.

The following paragraphs describe example data according to an embodiment of the present invention. In this embodiment, the test method described above is used to test the stance evaluation function of IBM Debater and finds a large number of input examples that lead to outputs that do not satisfy the consistency of the transitive relation of for/against. By training with this large amount of input data, this particular embodiment is able to make IBM Debater's stance evaluation consistent with financial texts. (Note: the terms "IBM" and/or "IBM DEBATER" may be subject to trademark rights in various jurisdictions throughout the world and are used here only in reference to the products or services properly denominated by the marks to the extent that such trademark rights may exist.)

The embodiment begins by setting t,s*,i,Tb. In this embodiment, t,s* are English sentences (not shown), i ranges between 0 and approximately 70, and Tb=0.6.

Figure 6:
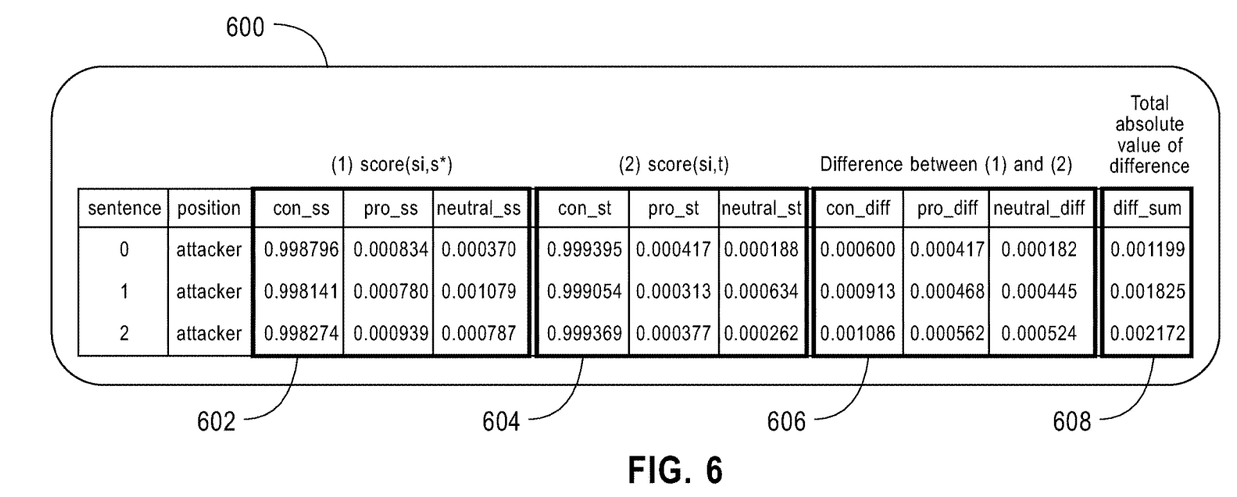
FIG. 6 is a table view of an example data set according to an embodiment of the present invention.
Figure 7:
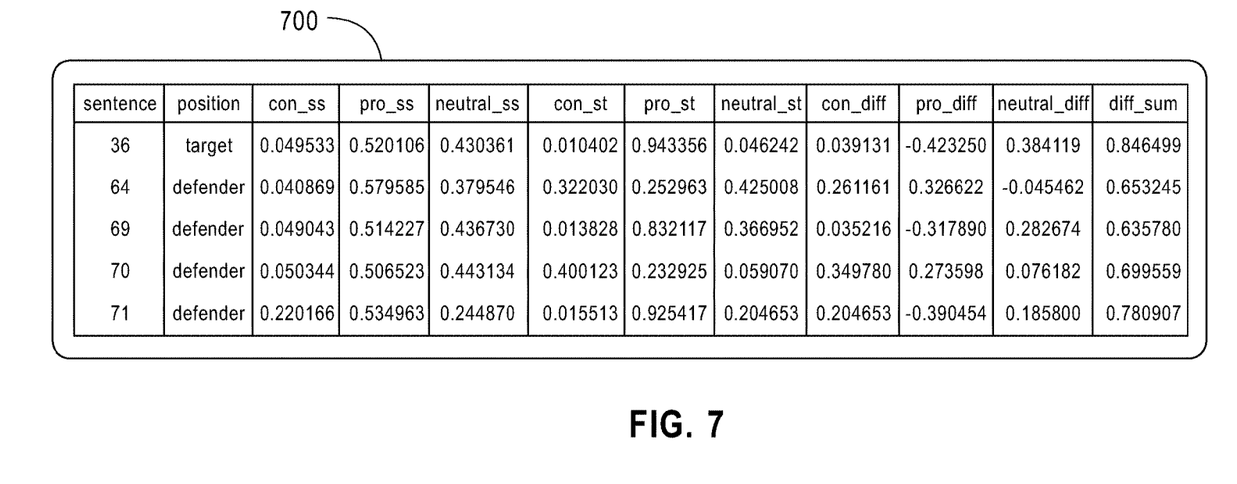
FIG. 7 is a table view of another example data set according to an embodiment of the present invention.

FIG. 6 and FIG. 7 depict example data sets 600 and 700, respectively, according to this embodiment, using Approach 2 and Check Method 2, described above. As shown in FIG. 6 and FIG. 7, for each sentence si (also referred to as "arguments"), the system generates: (i) set of scores score (si,s*) 602, including a con score ("con_ss"), a pro score ("pro_ss"), and a neutral score ("neutral_ss") for sentence s*; (ii) set of scores score(si,t) 604, including a con score ("con_st"), a pro score ("pro_st"), and a neutral score ("neutral_st") for sentence t; (iii) differences 606 between the con scores ("con_diff"), the pro scores ("pro_diff"), and the neutral scores ("neutral_diff"); and (iv) the total absolute values 608 of the combined differences.

Figure 8:
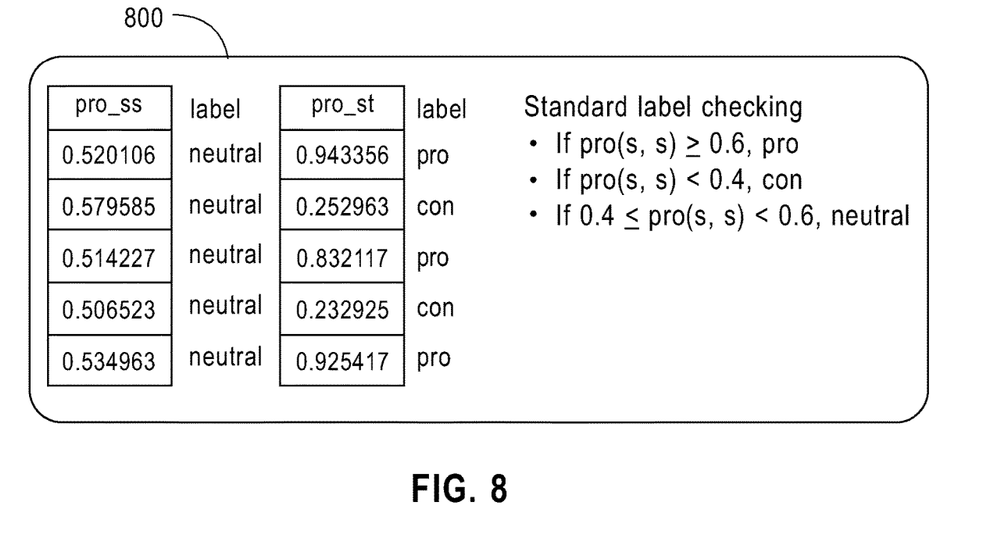
FIG. 8 is an annotated table view providing additional context for the example data set of FIG. 7, according to an embodiment of the present invention.
Figure 9:
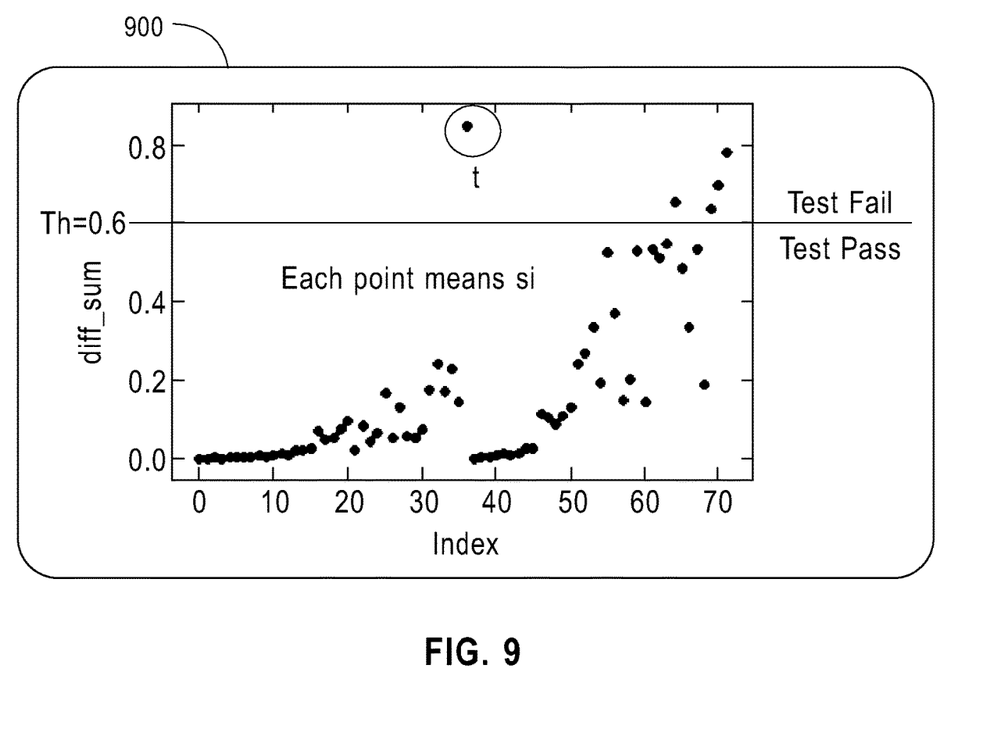
FIG. 9 is graph view depicting information helpful in understanding example data produced by various embodiments of the present invention.

FIG. 8 and FIG. 9 provide additional context with respect to the example data from FIG. 6 and FIG. 7. FIG. 8 includes example data subset 800, depicting values of the respective pro scores for sentence s* and sentence t, and respective labels resulting from those scores. In this example, which uses Check Method 2, described above, Tb=0.6, where Tb is the threshold for Check Method 2. The labels are produced by a standard label checking, where: (i) if pro(s,s)≥0.6, then the label is "pro," (ii) if pro(s,s)<0.4, then the label is "con," and (iii) if 0.4≤pro(s,s)<0.6, then the label is "neutral." FIG. 9 includes graph 900 depicting a plot of the sum of the absolute values of the differences ("diff_sum") for each of the approximately 70 sentences si. As shown in FIG. 9, the sentences having a "diff_sum" that exceeds Th (0.6) are indicated as "test fail," and the sentences having a "diff_sum" below Th are as "test pass." For the four cases that failed the test, the case did not, in fact, satisfy the transitive consistency for outputs, as can be seen by the conflicting labels depicted in FIG. 8.

Figure 10:
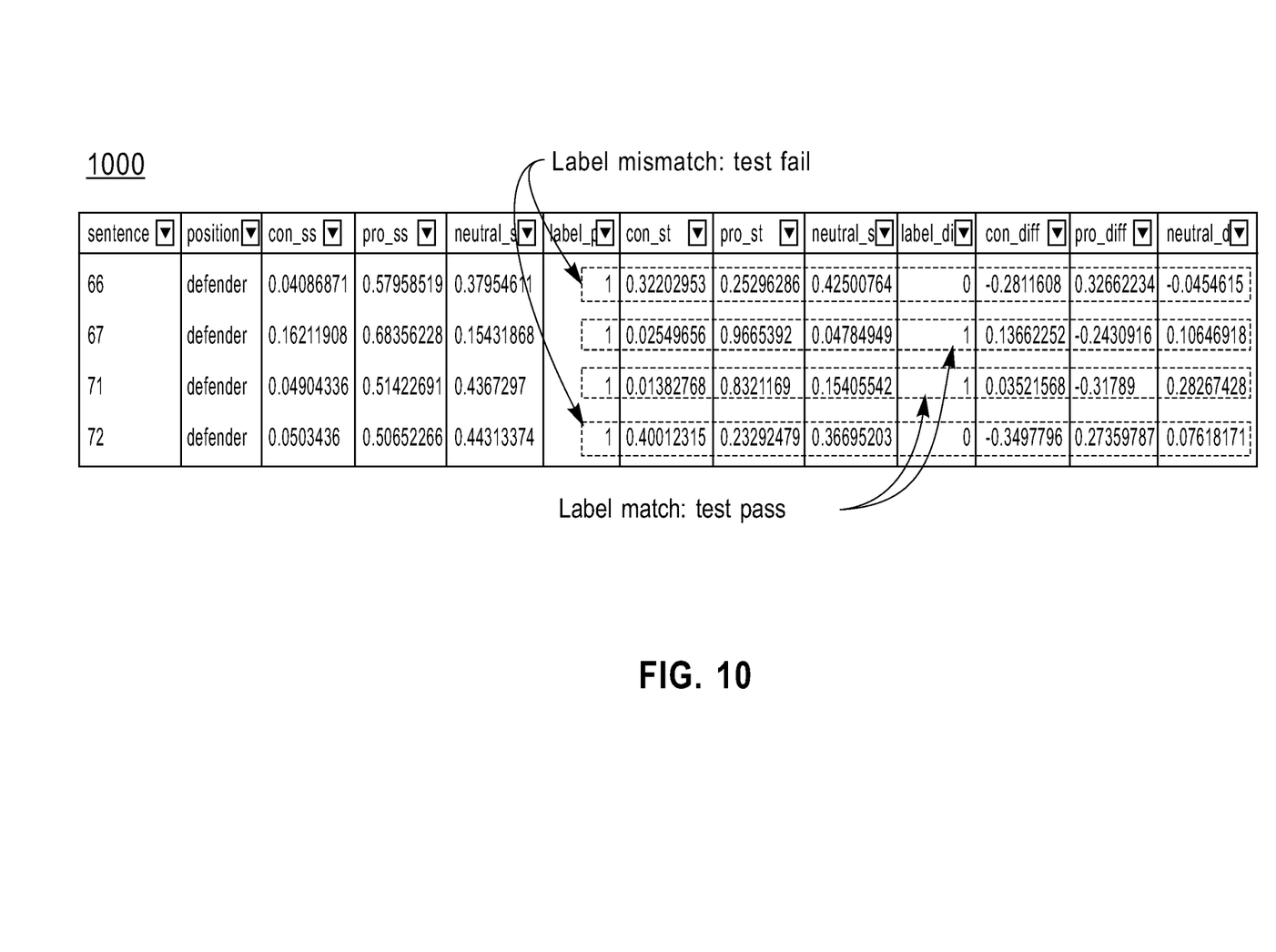
FIG. 10 is a table view of another example data set according to an embodiment of the present invention.

FIG. 10 depicts example data set 1000 according to the present embodiment, this time using Approach 1 and Check Method 1, described above, and Tr=0.6, where Tr is the threshold for Check Method 1. In this example, if the labels "label_pro_ss" and "label_pro_st" are different, the test is indicated as failing, while if the labels "label_pro_ss" and "label_pro_st" are the same, the test is indicated as passing. As shown in FIG. 10, sentence 68 and sentence 72 are indicated as a "test fail" because "label_pro_ss" and "label_pro_st" are different (i.e., do not match), and sentence 67 and sentence 71 are indicated as a "test pass" because "label_pro_ss" and "label_pro_st" are the same (i.e., match).

Figure 11:
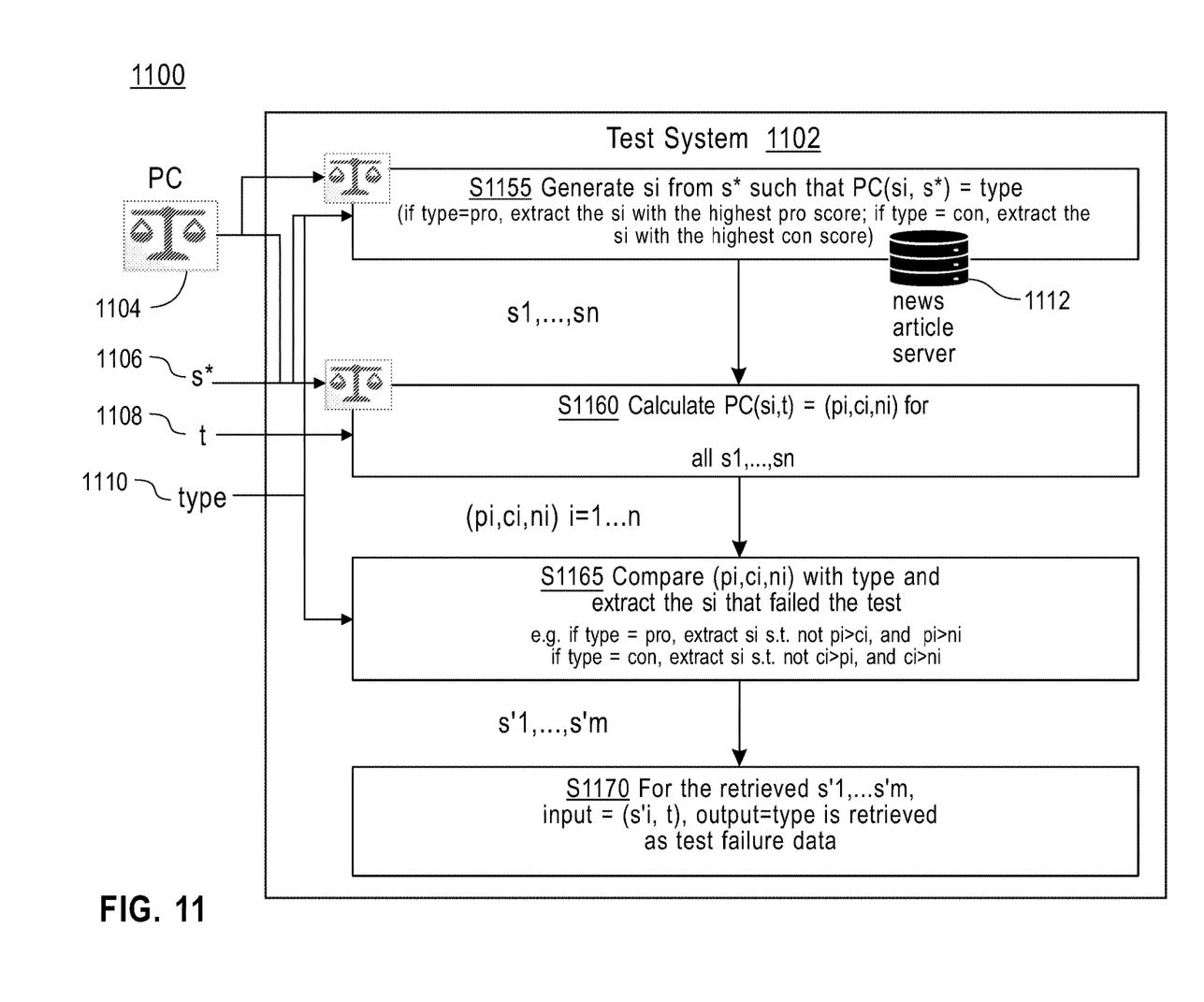
FIG. 11 is a diagram of a test system environment according to an embodiment of the present invention.

FIG. 11 depicts the configuration of test system environment 1100 according to an embodiment of the present invention. In FIG. 11, which depicts an implementation that uses Approach 1 and Check Method 2, described above, test system 1102 receives, as inputs: (i) output from pro/con score evaluator (PC) 1104, where PC 1104 receives input in the form of (target, source) and produces output in the form (pro, con, neutral); (ii) target sentence t 1106; (iii) seed sentence s* 1108, such that seed sentence s* 1108 implies target sentence t 1106; and (iv) type 1110, which is either "pro" or "con". Test system 1102 begins processing at operation S1155, where test stem 1102 uses PC 1104 and news article server 1112 to generate si from s* 1108 such that PC(si,s*)=type 1110, resulting in outputs s1, . . . , sn. In this embodiment, news article server 1112 enumerates pro sentences (for) and con sentences (against) in order of pro/con degree. If type 1110 equals "pro," test system 1102 extracts the si with the highest pro score. If type 1110 equals "con," test system 1102 extracts the si with the highest con score.

Processing proceeds to operation S1160, where test system 1102 uses PC 1104 to calculate PC(si,t)=(pi,ci,ni) for all s1, . . . , sn generated in operation S1155, resulting in (pi,ci,ni) for i=1 . . . n.

Processing then proceeds to operation S1165, where test system 1102 compares (pi,ci,ni) with type 1110 and extracts the si that failed the test, resulting in outputs s'1, . . . , s'm. If type 1110 equals "pro," operation S1165 extracts any si where pi is not greater than ci and where pi is not greater than ni. If type 1110 equals "con," operation S1165 extracts any si where ci is not greater than pi and where ci is not greater than ni.

Processing then proceeds to operation S1170, where test system 1102 retrieves input=(s'i,t) and output=type for the retrieved s'1, . . . , s'm as test failure data. The resulting outputs of test system 1102 include the test failure data, for use as new training data, which includes input=(t,s'i), . . . , (t,s'm) and output=type.

Various embodiments of the present invention recognize that while existing approaches for applying metamorphic testing may exist in the field of natural language processing (NLP), the transformation of input sentences in these approaches is generally not automated to an accuracy that can be used for test data. For example, methods for metamorphic testing of NLP do not provide an automatic general transformation procedure of the input, and the data is generated manually.

Various embodiments of the present invention provide a metamorphic test based on transitive logical relations that are normally expected to hold in pro/con, the value range in the pro/con evaluator, and not on metamorphic relations based on transformations of the inputs themselves. In various embodiment, the transformation of input is done mechanically, and therefore, all of the data generation, test execution, and test judgment can be mechanized.

Various embodiments of the present invention automatically generate test data by using a system under test (SUT) itself and a news article store to generate s' such that s'=>s, under the judgment of the SUT, from a sentence s. In various embodiments, s'=>s means that s' agrees with s, that s' implies s, and/or the like. By using a large news article store and the SUT, various embodiments of the present invention are able to find many sentences s' such that s'=>s automatically.

In various embodiments, the automatically generated data can be used as data to test that the output of the SUT satisfies the transitive consistency for the relation=>. As such, the test does not require a human to generate the input data, generate the expected values, or execute the test, which can significantly reduce the cost of the testing process in a testing view.

One approach according to various embodiments of the present invention (i.e., Approach 1) is to first give and fix s*,t such that s* implies t is satisfied, and then generate pro(si,s*)>T, making it easier to generate si satisfying pro (t,s*)>T and pro(s*, t)>T. This is because it can be relatively difficult to find t,s*, and si that simultaneously satisfy pro(t,s*)>T and pro(s*, t)>T, and it can be time-consuming or difficult to find many such t,s*, and si. In this approach, a user gives t,s* as input and then the system generates many si.

Another approach according to various embodiments of the present invention (i.e., Approach 2) is to first generate s*, t such that pro(s*,t)>Th, to fix s*, t, and then to generate si satisfying pro(si,s*)>T, making the test process fully automated. In this approach, all of t, s*, and si (the full input data) are generated.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User: includes, but is not necessarily limited to, the following: (i) a single individual human; (ii) an artificial intelligence entity with sufficient intelligence to act as a user; and/or (iii) a group of related users.

Without substantial human intervention: a process that occurs automatically (often by operation of machine logic, such as software) with little or no human input; some examples that involve "no substantial human intervention" include: (i) computer is performing complex processing and a human switches the computer to an alternative power supply due to an outage of grid power so that processing continues uninterrupted; (ii) computer is about to perform resource intensive processing, and human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

Automatically: without any human intervention.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method comprising:
   identifying a test input for a system under test,
      wherein the test input includes a seed
      and a target,
      the system under test comprises a machine learning model configured to determine a strength of an input relationship between received inputs, and
      the strength of the input relationship between the seed and the target according to the system under test meets a first threshold;
   determining, from a data store of potential inputs, a set of inputs for which the strength of the input relationship to the seed according to the system under test meets a second threshold;
   removing from the set of inputs one or more inputs for which the strength of the input relationship to the target according to the system under test does not meet a third threshold, or
   removing from the set of inputs one or more inputs for which an absolute value of the difference between the strength of the input relationship with the seed and the strength of the input relationship to the target according to the system under test is above a fourth threshold;
   utilizing the set of inputs to train the system under test, including utilizing unremoved inputs from the set of inputs as test pass data;
   utilizing the inputs removed from the set of inputs as test failure data; and
   testing a transitive consistency of an output of the system under test.

2. The computer-implemented method of claim 1, wherein the inputs of the set of inputs and the test input include natural language text.

3. The computer-implemented method of claim 2, wherein the input relationship is a logical implication relationship.

4. The computer-implemented method of claim 2, wherein the input relationship is an agree/disagree relationship.

5. The computer-implemented method of claim 2, wherein the data store of potential inputs includes news articles.

6. The computer-implemented method of claim 1, wherein testing the transitive consistency of the output of the system under test comprises:
   providing the target and a first input from the set of inputs to the system under test as input, yielding a first output;
   providing the target and a second input from the set of inputs to the system under test as input, yielding a second output; and
   performing a comparison between the first output and the second output.

7. The computer-implemented method of claim 1, further comprising receiving the seed and the target from a user.

8. The computer-implemented method of claim 1, further comprising generating the seed and the target utilizing the system under test and the data store of potential inputs.

9. A computer program product comprising one or more computer readable storage media and program instructions collectively stored on the one or more computer readable storage media, the program instructions executable by one or more computer processors to cause the one or more computer processors to perform a method comprising:
   identifying a test input for a system under test, wherein
      the test input includes a seed and a target,
      the system under test comprises a machine learning model configured to determine a strength of an input relationship between received inputs, and
      the strength of the input relationship between the seed and the target according to the system under test meets a first threshold;
   determining, from a data store of potential inputs, a set of inputs for which the strength of the input relationship to the seed according to the system under test meets a second threshold;
   removing from the set of inputs one or more inputs for which the strength of the input relationship to the target according to the system under test does not meet a third threshold, or
   removing from the set of inputs one or more inputs for which an absolute value of the difference between the strength of the input relationship with the seed and the strength of the input relationship to the target according to the system under test is above a fourth threshold;
   utilizing the set of inputs to train the system under test, including utilizing unremoved inputs from the set of inputs as test pass data;
   utilizing the inputs removed from the set of inputs as test failure data; and
   testing a transitive consistency of an output of the system under test.

10. The computer program product of claim 9, wherein testing the transitive consistency of the output of the system under test comprises:
providing the target and a first input from the set of inputs to the system under test as input, yielding a first output;
providing the target and a second input from the set of inputs to the system under test as input, yielding a second output; and
performing a comparison between the first output and the second output.

11. The computer program product of claim 9, wherein the inputs of the set of inputs and the test input include natural language text.

12. The computer program product of claim 11, wherein the input relationship is a logical implication relationship.

13. The computer program product of claim 11, wherein the input relationship is an agree/disagree relationship.

14. The computer program product of claim 11, wherein the data store of potential inputs includes news articles.

15. A computer system
comprising: one or more computer
processors; and
one or more computer readable storage media; wherein:
the one or more computer processors are structured, located, connected and/or programmed to execute program instructions collectively stored on the one or more computer readable storage media; and
the program instructions, when executed by the one or more computer processors, cause the one or more computer processors to perform a method comprising:
identifying a test input for a system under test, wherein the test input includes a seed and a target,
the system under test comprises a machine learning model configured to determine a strength of an input relationship between received inputs, and
the strength of the input relationship between the seed and the target according to the system under test meets a first threshold;
determining, from a data store of potential inputs, a set of inputs for which the strength of the input relationship to the seed according to the system under test meets a second threshold;
removing from the set of inputs one or more inputs for which the strength of the input relationship to the target according to the system under test does not meet a third threshold, or
removing from the set of inputs one or more inputs for which an absolute value of the difference between the strength of the input relationship with the seed and the strength of the input relationship to the target according to the system under test is above a fourth threshold;
utilizing the set of inputs to train the system under test, including utilizing unremoved inputs from the set of inputs as test pass data;
utilizing the inputs removed from the set of inputs as test failure data; and
testing a transitive consistency of an output of the system under test.

16. The computer system of claim 15, wherein testing the transitive consistency of the output of the system under test comprises:
providing the target and a first input from the set of inputs to the system under test as input, yielding a first output;
providing the target and a second input from the set of inputs to the system under test as input, yielding a second output; and
performing a comparison between the first output and the second output.

17. The computer system of claim 15, wherein the inputs of the set of inputs and the test input include natural language text.

18. The computer system of claim 17, wherein the input relationship is a logical implication relationship.

19. The computer system of claim 17, wherein the input relationship is an agree/disagree relationship.

20. The computer system of claim 17, wherein the data store of potential inputs includes news articles.

* * * * *